June 7, 1960
A. L. HIGHBERG
2,939,279
JET NOISE SUPPRESSOR
Filed Aug. 20, 1957
2 Sheets-Sheet 1
FIG_1
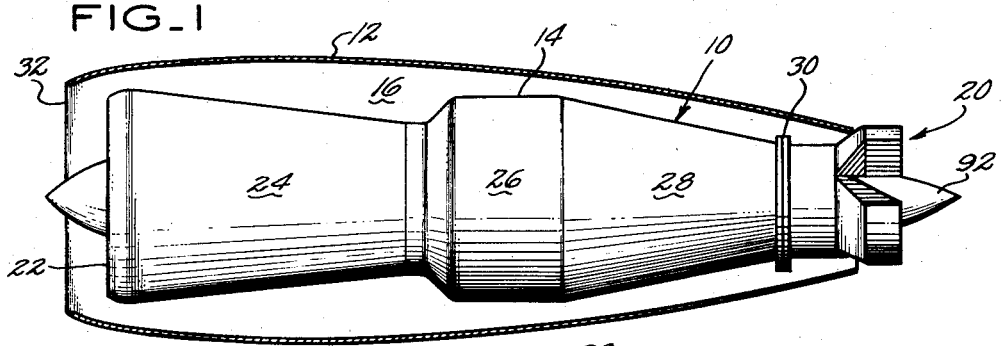
FIG_2
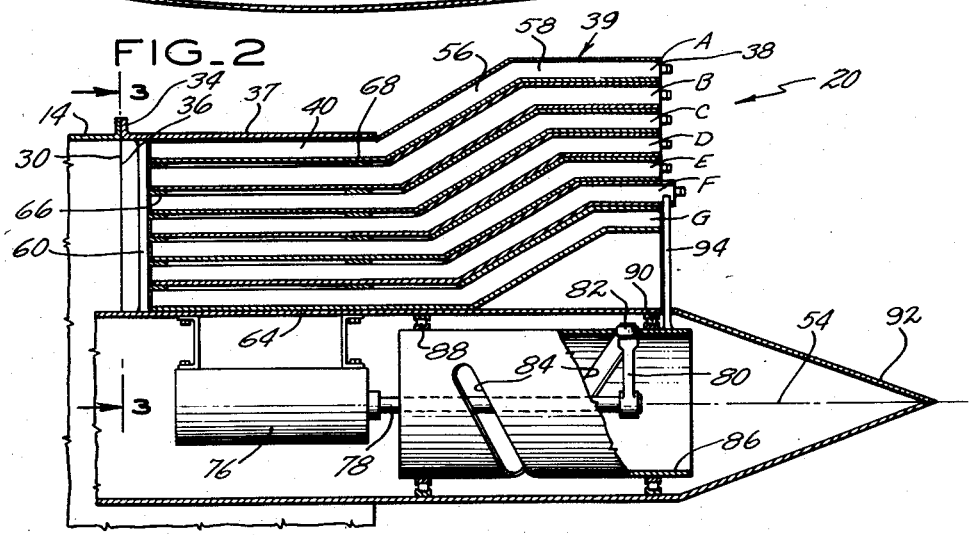
FIG_3
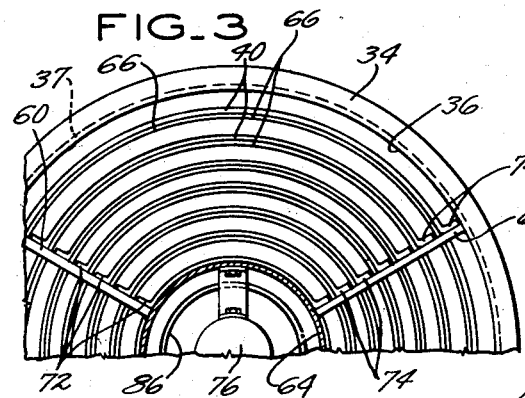
FIG_6
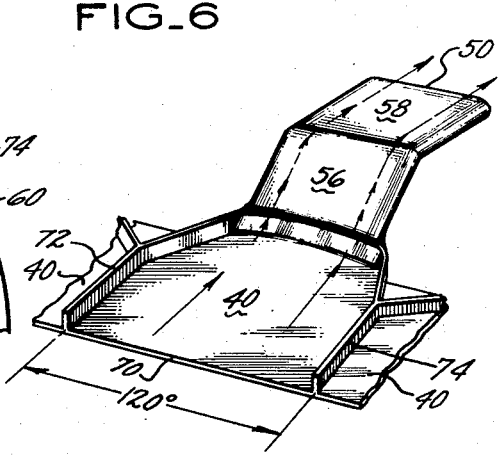
INVENTOR
AXEL L. HIGHBERG
BY Vernon F. Hauschild
ATTORNEY June 7, 1960

A. L. HIGHBERG 2,939,279

JET NOISE SUPPRESSOR

Filed Aug. 20, 1957

INVENTOR
AXEL L. HIGHBERG
BY *Vernon F. Hauschild*
ATTORNEY

United States Patent Office 2,939,279
Patented June 7, 1960

2,939,279
JET NOISE SUPPRESSOR

Axel L. Highberg, West Hartford, Conn., assignor to United Aircraft Corporation, East Hartford, Conn., a corporation of Delaware Filed Aug. 20, 1957, Ser. No. 679,184

11 Claims. (Cl. 60—35.6)

This invention relates to noise suppression and more particularly to the suppression of the noise of the jet blast from a modern aircraft turbojet engine.

It is an object of my invention to provide a jet noise suppressor which performs a noise suppression function by discharging all of the exhaust gases through a plurality of circumferentially or tangentially extending slots, which slots may be rotated to a clustered, non-silencing position and also to a silencing position.

It is a further object of my invention to fabricate my rotatable slots such that when in their clustered, non-silencing position they will form a plurality of equally spaced exhaust gas discharge lobes.

It is a further object of my invention to fabricate my noise suppressor such that when in its silencing position, it will form a continuous, circumferentially extending pattern of radially spaced slots between which secondary air may be circulated.

Other objects and advantages will be apparent from the specification and claims, and from the accompanying drawings which illustrate an embodiment of the invention.

In the drawings:

Fig. 1 is an external showing of a modern aircraft turbojet engine encased within an aircraft nacelle and utilizing my exhaust silencer.

Fig. 2 is a cross-sectional showing through my exhaust silencer to illustrate gas flow passages with the silencer in the clustered position and to further illustrate the actuating mechanism.

Fig. 3 is a view taken along line 3—3 of Fig. 2.

Fig. 6 is a fragmentary developed perspective view of one of my circumferential or tangential exhaust slots showing the scoop arrangement at the forward end thereof.

Figure 4:
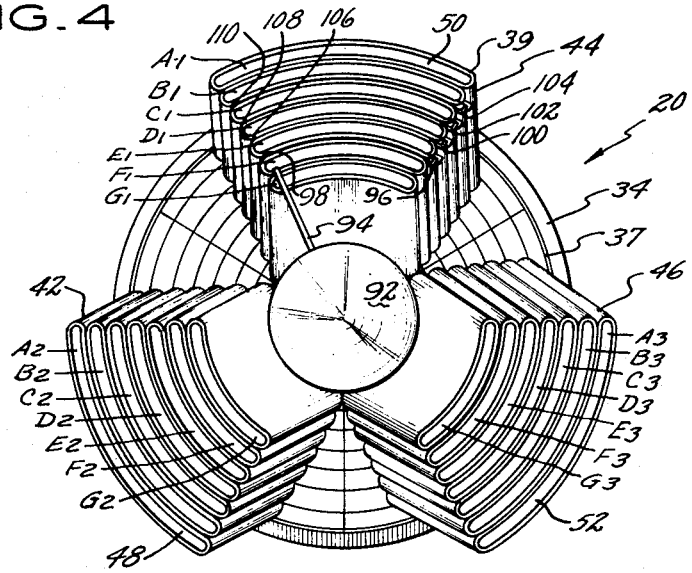
Fig. 4 is a somewhat reduced rear view of my exhaust silencer in the clustered or non-silencing position.

Referring to Fig. 1 we see aircraft turbojet engine 10 encased within engine nacelle 12 such that primary air will flow through engine 10 within the gas passage formed by engine casing 14, which is of substantially circular cross section. Secondary air will flow through passage 16 defined by the exterior of engine case 14 and the interior of airplane nacelle 12.

Fig. 1 shows my jet noise suppressor 20 attached to engine case 14 and forming an exhaust gas passage extending from engine case 14 and providing a plurality of circumferentially extending slots through which all of the exhaust gases generated within engine 10 will be discharged.

In accordance with well known construction and as fully disclosed in U,S. Patents Nos. 2,711,631 and 2,700,946, engine 10 comprises air inlet section 22, compressor section 24, combustion chamber section 26, turbine section 28 and the normal exhaust outlet 30. With the airplane in motion, ram air will enter the engine 10 through air inlet 22 to become the primary air while also entering nacelle inlet 32 to gain admission to gas passage 16 to become the secondary air. Compressor section 24 performs the function of compressing the primary air before it is introduced to and heated in combustion section 26. The heated air leaving combustion section 26 passes through turbine section 28 and power is extracted therefrom to drive the compressor and the exhaust gases are then ready to be discharged in a thrust generating function. Normally, the exhaust gas is discharged through circular exhaust outlet 30, defined by engine case 14. Experience has shown that the low frequency and audible sound waves formed in the turbulent jet wake when discharged from a large engine exhaust outlet such as 30, may be changed to high frequency, inaudible sound waves by discharging the exhaust gases through a plurality of small apertures as more fully described in U.S. application Ser. Nos. 474,807, filed on December 13, 1954, in the name of John M. Tyler, and 581,418, filed on April 30, 1956, in the name of Tyler et al. Experience has further shown that aerodynamic flight advantage may be gained by forming a plurality of small exhaust outlets or nozzles in the form of circumferentially equally spaced shark fins as disclosed in U.S. application Ser. No. 574,884, filed on March 29, 1956, in the name of John M. Tyler, and further that maximum silencing can be gained if the exhaust is discharged through a plurality of circumferentially extending slots which are radially spaced to permit the flow of secondary air therebetween for the purpose of mixing with the primary air being discharged through the slots and that such is best obtained through a symmetric, continuous, circumferentially extending slot pattern.

Fig. 4 shows the exhaust slots and the attendant ducting in the clustered or non-silencing position in which my silencer forms three equal area exhaust gas passages which are circumferentially equally spaced about an exhaust outlet of circular form and which have equal area voids therebetween. It will be noted that the clustered slots are in tight radial engagement.

Figure 5:
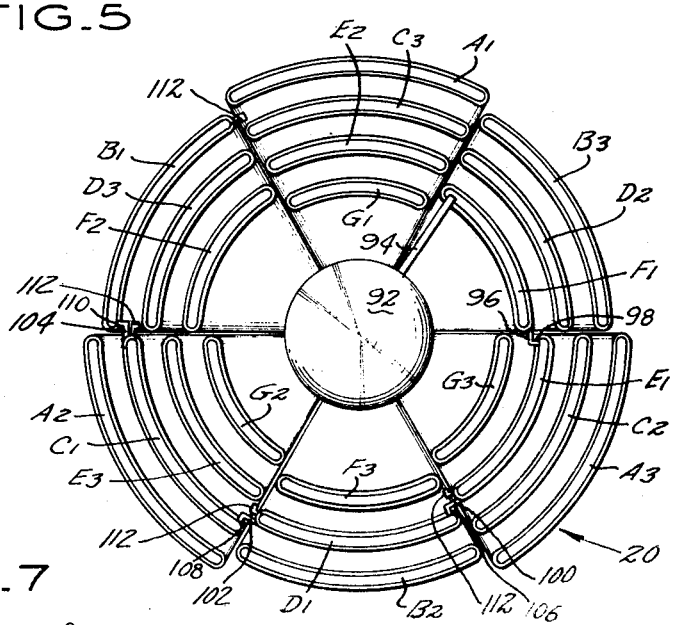
Fig. 5 is a somewhat reduced rear view of my exhaust silencer in the operable or silencing position.
Figure 7:
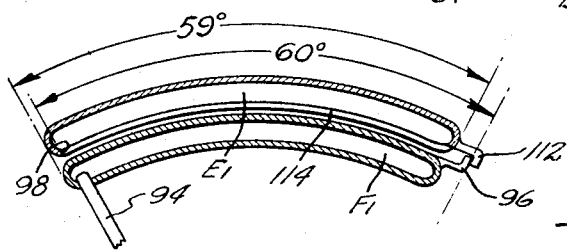
Fig. 7 is a fragmentary enlarged rear view of my exhaust silencer showing a portion of the actuating system.

Fig. 5 shows the exhaust slots and the attendant ducting in the silencing position in which the slots form a continuous, symmetric, circumferentially extending pattern with substantially radial clearance between adjacent slots and with circumferential clearance between adjacent slots to permit the entry of secondary air (see Fig. 7). This secondary air will flow between adjacent slots and mix with the primary air being discharged through the slots to effect silencing.

Referring to Fig. 2 we see engine casing 14 which is preferably of circular cross section and which culminates in circular exhaust outlet 30. Attachment means 34 attaches noise suppressor 20 to case 14 of engine 10. Noise suppressor 20 comprises circular inlet 36 defined by outer shell, pipe or duct 37 and outlet 38 of circular form. Noise suppressor 20 comprises a plurality of concentric, coaxial duct units such as 39, each of which is shaped to have an annular inlet, such as 40, and which smoothly blends into three circumferentially equally spaced ducts, such as 42, 44 and 46 (Fig. 4) and culminates in three equal area circumferentially extending slots which are circumferentially equally spaced such as 48, 50 and 52 (Fig. 4). It will be further noted that duct unit 39 projects outwardly to an enlarged diameter from axis 54 at section 56 and projects axially along axis 54 at section 58 to discharge rearwardly. It will further be noted that, as shown in Fig. 4, the slots of each succeeding duct unit extend through the same circumferential arc as all other slots but that the slots become progressively smaller in area due to their diminished radius, commencing with the outer and ending with the inner slots. In view of this, the slot clusters shown in Fig. 4 may be described as V- shaped or pie-shaped and form the equally spaced aerodynamic lobes.

Each duct unit such as 39, contains three integral ducts such as 42, 44, and 46 which will rotate as a unit when used in noise suppressor 20. Obviously, all duct units such as 39 could be made to be rotatable, however, some could as well be stationary and I have chosen to illustrate a noise suppressor in which the outermost and innermost duct units are stationary while all duct units therebetween are rotatable.

For the purpose of this description, I will refer to the outermost duct unit as "A," the outermost rotatable unit as "B," the next outermost rotatable unit as "C," the next outermost rotatable unit as "D," the next outermost rotatable unit as "E," the next outermost rotatable unit as "F," and the innermost unit, which is stationary, as "G," as shown in Fig. 2, and to the slots of duct unit A as A1, A2 and A3, and so on, as shown in Figs. 4 and 5.

Again referring to Fig. 2, primary air enters inlet 36 of jet noise suppressor 20 from exhaust outlet 30 of jet engine 10. This primary air then passes through the duct units A through G and is discharged through circular form outlet 38. Spoke-type supports 60 extend radially between the outer circular shell 37 and the inner circular shell 64 of jet noise suppressor 20. A plurality of circumferentially extending and radially spaced support rings, such as 66, project from spokes 60 and axially position and support the forward ends of duct units A through G. Circumferential bearing rings, such as 68, may be positioned between adjacent duct units to give a second point of support. Obviously, by appropriate duct dimpling on each side of bearing ring 68, the movable duct units B through F may be retained axially in position, however, duct unit contouring at 56 alone may suffice. Stationary ducts A and G will radially position the movable ducts B through F.

Fig. 6 shows a developed scoop arrangement of the type used for each duct and slot of each duct unit to form annular inlet, such as 40. The leading or upstream edge 70 is of circular form and engages a support ring such as 66. Leading edge 70 is divided into three equal sections of substantially 120° span by radially extending sidewalls 72 and 74. Side walls 72 and 74 define a passage with the adjacent duct units and smoothly blend into a confined duct, such as 44, in passing through diametrically expanding section 56 and axially extending section 58 to culminate in one of our circumferentially or tangentially extending exhaust gas discharge slots, such as 50. In this fashion, all of the primary air or gas which enters the inlet 40 of duct unit A or 39, Fig. 2, will reach the three discharge slots, 48, 50, and 52, which form duct unit 39 in substantially equal quantities. Further, since the duct units A through G, are concentric and coaxial about axis 54, the annular inlets of each duct unit A through G will be successively smaller area-wise in that order and will culminate in circumferential discharge slots or proportionate area. All discharge slots extend through an equal circumferential slot but, due to the concentric relationship which exists between duct units A through G, the discharge slots become progressively small in that order, thereby permitting the V-shaped cluster or multi-lobe formation. It will be noted that the annular inlets, such as 40, of duct units A through G consume the entire gas passage formed between noise suppressor outer cylindrical shell, pipe or duct 37 and the inner shell 64 so that all exhaust gases are passed through the exhaust slots at all times.

By way of actuation, it will be noted by referring to Fig. 2 that actuating cylinder-piston unit 76 is provided and that rod 78 is caused to oscillate by the movement of the piston within the cylinder-piston unit 76. Fluid may be admitted to either side of the piston within actuating unit 76 to cause oscillation or translation of rod 78. Rod 78 carries arm 80, which, by construction, is permitted to move axially only and which either engages directly or through bearing 82, cam slot 84 within rotating drum or cylinder 86. Bearings such as 88 and 90 concentrically mount rotatable drum 86 within shell 64. Tailcone 92 is provided for aerodynamic purposes.

Rod 94 is attached to and carried in rotation by rotating drum 86. Rod 94 is received in the wall of the first movable slot $F_1$ as seen in Figs. 4 and 7. It should be borne in mind that duct units A and G are stationary. As actuating cylinder-piston unit 76 causes drum 86 to rotate in a counterclockwise direction, arm 94 will cause duct unit F to rotate 60° in a counterclockwise direction until lug 96, which is carried by the clockwise edge of slot $F_1$ of duct unit F engages stop 98 of slot $E_1$ and thereafter pulls duct unit E along with duct unit F. In similar fashion lugs 100, 102 and 104 engage stops 106, 108, and 110, respectively, of duct units D, C and B to cause duct units D, C, and B to follow in spaced circumferential sequence behind the other rotatable ducts until, as shown in Fig. 5, slot $F_1$ has rotated 300°, slot $E_1$ has rotated 240° slot $D_1$ ras rotated 180°, slot $C_1$ has rotated 120° and slot $B_1$ has rotated 60°.

In similar fashion but by clockwise rotation of cylinder 86 and arm 94, all slots may be returned to their clustered Fig. 4 position.

By referring to Fig. 7 it will be noted that arm 94 is shown to be fixedly attached to slot $F_1$ while lug 96 projects in a clockwise direction from slot $F_1$. If slot $F_1$ should move in a clockwise direction lug 96 will engage lug 112 of slot $E_1$ and if slot $F_1$ were rotated in a counterclockwise direction, lug 96 would rotate some 60° within slot or track 114 of slot $E_1$ until it engaged stop 98. Lugs similar to 112 are placed on slots $D_1$, $C_1$, and $B_1$ to perform a similar function of slot return.

As shown in Fig. 7 it will be noted that for purposes of illustration we have shown that our exhaust discharge slots such as $E_1$ and $F_1$ extend through an arc of 59° but that, due to the extended position of lugs such as 96 and 112 and the use of track or slot 114 with stops such as 98, the slots such as $E_1$ and $F_1$ are caused to rotate 60° on centers. Accordingly, a circumferential clearance will exist between circumferentially adjacent slots when in the silencing (Fig. 5) position to admit the entry of secondary air from gas passage 16 to be dispersed between adjacent slots to effect jet noise suppression by mixing with the primary discharge air being discharged through the slots.

While I have chosen to show a particular embodiment, it should be borne in wind that various rotatable slot configurations would be apparent to one skilled in the art without deviating from the scope of my invention.

I claim:

1. A jet noise suppressor comprising a substantially circular shell with an axis having an outlet in substantially circular form thru which exhaust gases may be passed, a plurality of duct units mounted for rotation on said shell and with each unit carrying an equal number of circumferentially equally spaced ducts each of which opens into said shell and culminates in a circumferentially extending slot which cooperates with such slots in all other ducts to form said outlet, said slots each extending thru an equal circumferential arc, said ducts being shaped so that each duct on one of said units is similar and so that the ducts projecting from each unit form slots positioned at lesser radius from said axis than the slots formed by the ducts attached to the unit radially outboard thereof, and means to rotate said units to a retracted position wherein said slots are radially aligned in a plurality of clusters and to rotate said units to a noise suppressing position wherein said slots form a substantially uniform, circumferentially extending slot pattern, said ducts being so shaped that when in said retracted position said slot clusters are of substantially equal area and circumferentially equally spaced and with substantially equal area, circumferentially equally spaced voids therebetween and that when in said noise suppressing position a radial and circumferential clearance exists between adjacent ducts to define a secondary gas passage around said slots.

2. A jet noise suppressor comprising a substantially circular shell with an axis having an outlet in substantially circular form thru which exhaust gases may be passed, a plurality of concentric and coaxial duct units mounted for rotation on said shell and with each unit carrying an equal number of circumferentially equally spaced ducts each of which opens into said shell, then projects outwardly to a greater diameter and culminates in a circumferentially extending slot which cooperates with such slots in all other ducts to form said outlet, said slots each extending thru an equal circumferential arc, scoop means in the form of annular inlets opening into said shell from each of said units, and means to rotate said units to a retracted position wherein said slots are radially aligned in a plurality of clusters and to rotate said units to a noise suppressing position wherein said slots form a substantially uniform, circumferentially extending slot pattern, said ducts being so shaped that when in said retracted position said slot clusters are of substantially equal area and circumferentially equally spaced and with substantially equal area, circumferentially equally spaced voids therebetween and that when in said noise suppressing position a radial and circumferential clearance exists between adjacent ducts to define a secondary gas passage around said slots.

3. A jet noise suppressor comprising a substantially circular shell with an axis having an outlet in substantially circular form thru which exhaust gases may be passed, a plurality of concentric, coaxial duct units mounted on said shell and with some of said ducts mounted for rotation on said shell and with each duct carrying an equal number of circumferentially equally spaced ducts each of which opens into said shell in an annular inlet and culminates in a circumferentially extending slot which cooperates with such slots in all other ducts to form said outlet, said slots each extending thru an equal circumferential arc, said ducts being shaped so that each duct on one of said units is similar, and means to rotate said rotatable units to a retracted position wherein said slots are radially aligned in a plurality of clusters and to rotate said rotatable units to a noise suppressing position wherein said slots form a substantially uniform, circumferentially extending slot pattern, said ducts being so shaped that when in said retracted position said slot clusters are of substantially equal area and circumferentially equally spaced and with substantially equal area, circumferentially equally spaced voids therebetween and that when in said noise suppressing position a radial and circumferential clearance exists between adjacent ducts to define a secondary gas passage around said slots.

4. A jet noise suppressor comprising a substantially circular shell with an axis having an outlet in substantially circular form thru which exhaust gases may be passed, a plurality of concentric, coaxial duct units mounted on said shell and with some of said units mounted for rotation on said shell and with each unit carrying an equal number of circumferentially equally spaced ducts each of which opens into said shell and culminates in a circumferentially extending slot which cooperates with such slots in all outer ducts to form said outlet, said slots each extending thru an equal circumferential arc, said ducts being shaped so that each duct on one of said units is similar, and means to rotate one of said rotatable units such that all other rotatable units follow in circumferentially spaced sequence to a retracted position wherein said slots are radially aligned in a plurality of clusters and also to so rotate said units to a noise suppressing position wherein said slots form a substantially uniform, circumferentially extending slot pattern, said ducts being so shaped that when in said retracted position said slot clusters are of substantially equal area and circumferentially equally spaced and with substantially equal area, circumferentially equally spaced voids therebetween and that when in said noise suppressing position a radial and circumferential clearance exists between adjacent ducts to define a secondary gas passage around said slots.

5. A jet noise suppressor having an axis and comprising a plurality of duct units, each of said duct units having an annular exhaust gas inlet and blending into at least one duct culminating in the shape of and defining a circumferentially extending slot defining the exhaust gas outlet, means supporting said duct units in concentric relation, and means to rotate said duct units relative to one another between a first position wherein said slots are clustered in substanial radial alignment and to a second position wherein said slots are dispersed to form a symmetrical pattern about said axis, said ducts being so shaped that when in said second position, both radial and circumferential clearance exists between adjacent ducts to define a secondary gas passage around said slots.

6. A jet noise suppressor having an axis and comprising a plurality of duct units, each of said duct units having an annular exhaust gas inlet and separating into a plurality of circumferentially equally spaced ducts culminating in the shape of and defining a plurality of circumferentially extending, circumferentially equally spaced slots defining the exhaust gas outlet, means supporting said duct units in concentric relation, and means to rotate said duct units relative to one another between a first position wherein said slots are radially aligned in a plurality of circumferentially equally spaced clusters and to a second position wherein said slots are dispersed to form a substantially uniform, circumferentially extending slot pattern, said ducts being so shaped that when in said second position, both radial and circumferential clearance exists between adjacent ducts to define a secondary gas passage around said slots.

7. A jet noise suppressor having an axis and a substantially circular inlet and an outlet in substantially circular form through which exhaust gases may be passed and comprising a plurality of duct units, each of said duct units having an annular exhaust gas inlet and separating into a plurality of circumferentially equally spaced ducts culminating in the shape of and defining a plurality of circumferentially extending, circumferentially equally spaced slots defining the exhaust gas outlet, each of said slots extending through an equal circumferential arc, means supporting said duct units in concentric relation, and means to rotate said duct units relative to one another between a first position wherein said slots are tightly radially aligned in a plurality of substantially equal area, circumferentially equally spaced V-shaped clusters with substantially equal area, circumferentially equally spaced V-shaped voids between said clusters and to a second position wherein said slots are dispersed to form a substantially uniform slot pattern throughout said circular form outlet, said ducts being so shaped that when in said second position, both radial and relatively slight circumferential clearance exists between adjacent ducts to define a secondary gas passage around said slots.

8. A turbojet aircraft engine having an exhaust gas discharge pipe of substantially circular cross section, a jet noise suppressor of substantially circular cross section connected to said discharge pipe and comprising a plurality of concentric duct units each having an annular inlet blending into a plurality of circumferentially equally spaced ducts each of which ducts defines an elongated, circumferentially extending slot at its after end, means to support said duct units in concentric relation for relative rotation with respect to one another, means to rotate said duct units relative to one another between a first position in which said slots are grouped in radial alignment into a plurality of circumferentially equally spaced groups with voids therebetween and a second position in which said slots form a substantially uniform pattern of generally circular form, said ducts being so shaped that when in said second position, both radial and circumferential clearance exists between adjacent ducts to define a secondary gas passage around said slots, and means to pass air through said secondary gas passage.

9. A jet noise suppressor having an axis comprising gas passage defining ducting culminating in a plurality of narrow slots radially spaced from and extending circumferentially about said axis with at least some of said ducting being movable, means to support said ducting for relative motion, said ducting being shaped so that said slots may be positioned in at least one radially aligned cluster and so that said slots may be disseminated to form a slot pattern of circular form with exterior gas passages defined therebetween.

10. A jet noise suppressor comprising gas passage defining ducting culminating in a plurality of slots with at least some of said ducting being movable, means to support said ducting for relative motion, said ducting being shaped so that said slots may be positioned in at least one cluster and so that said slots may be disseminated to form a symmetric slot pattern of circular form with exterior gas passages defined therebetween.

11. A jet noise suppressor comprising gas passage defining means culminating in and defining a plurality of slots, means to support said ducting for relative motion, means to move said slots to a clustered position and to a noise suppressor position, said ducting being so shaped that when in said clustered position, said slots are in tight radial alignment, and when in said noise suppressor position, said slots form a symmetric slot pattern of circular form with both radial and circumferential voids in said ducting to define a secondary gas passage around said slots.

References Cited in the file of this patent
FOREIGN PATENTS
74,778     Norway _____ Mar. 14, 1949